United States Patent [19]
Yuyama et al.

[11] Patent Number: 5,930,145
[45] Date of Patent: Jul. 27, 1999

[54] METHOD FOR MEDICAMENT STOCK MANAGEMENT BY TRANSPONDERS AND APPARATUS THEREFOR

[75] Inventors: Shoji Yuyama; Hiroyasu Hamada, both of Toyonaka, Japan

[73] Assignee: Yuyama Mfg. Co., Ltd., Osaka-fu, Japan

[21] Appl. No.: 08/759,778

[22] Filed: Dec. 3, 1996

[51] Int. Cl.⁶ ..................................... G06F 17/00
[52] U.S. Cl. ............... 364/479.01; 364/479.14; 364/479.11; 364/479.12; 235/375
[58] Field of Search ............ 364/479.01, 479.1, 364/479.11, 479.14; 235/375; 53/154

[56] References Cited

U.S. PATENT DOCUMENTS

| | | | |
|---|---|---|---|
| 4,847,764 | 7/1989 | Halvorson | 364/479 |
| 5,337,919 | 8/1994 | Spaulding et al. | 221/13 |
| 5,597,995 | 1/1997 | Williams et al. | 364/479.01 |
| 5,608,643 | 3/1997 | Wichter et al. | 364/479.11 |
| 5,709,063 | 1/1998 | Yuyama et al. | 53/168 |
| 5,720,154 | 2/1998 | Lasher et al. | 53/168 |

FOREIGN PATENT DOCUMENTS

| | | |
|---|---|---|
| 2-269621 | 11/1990 | Japan . |
| 4-102168 | 4/1992 | Japan . |
| 5-60948 | 9/1993 | Japan . |

*Primary Examiner*—William Grant
*Assistant Examiner*—Carolyn T. Baumgardner
*Attorney, Agent, or Firm*—Wenderoth, Lind & Ponack, L.L.P.

[57] ABSTRACT

A plurality of cartridges are each provided with a transponder which is operative, in response to an external command signal, to receive and store medicament information including name and quantity of a medicament and to externally transmit the stored medicament information. A discharge quantity of medicament to be discharged from the cartridge is measured, while a current stock quantity of medicament stored in the transponder is read. Then, the discharge quantity of medicament is subtracted from the current stock quantity of medicament, and the balance is written as new stock quantity of medicament into the transponder.

6 Claims, 9 Drawing Sheets

Fig. 3
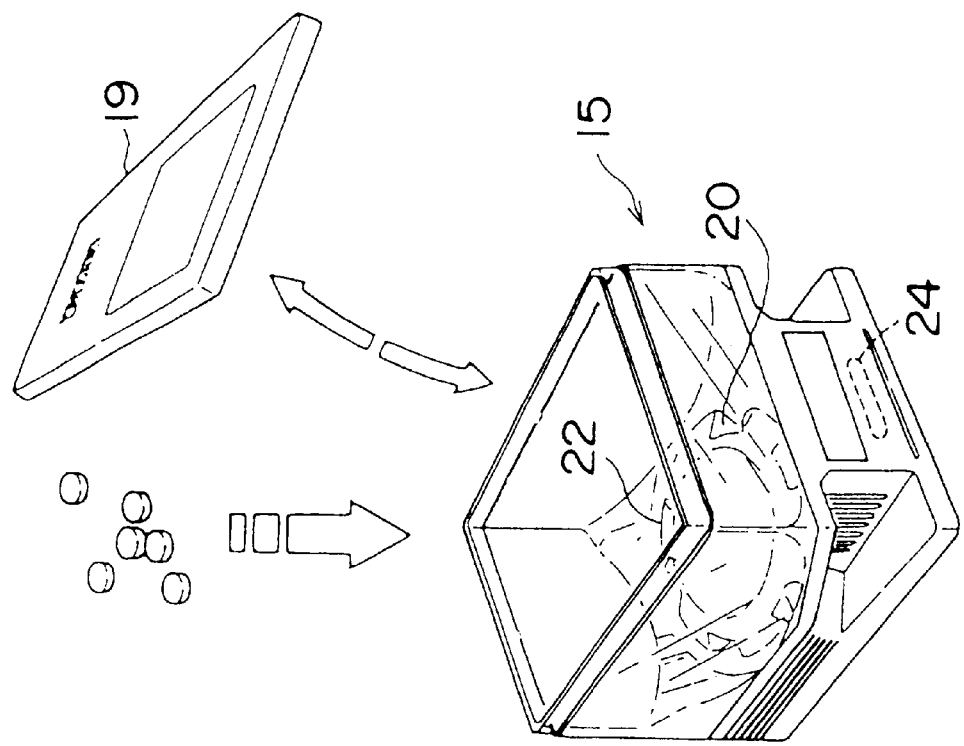
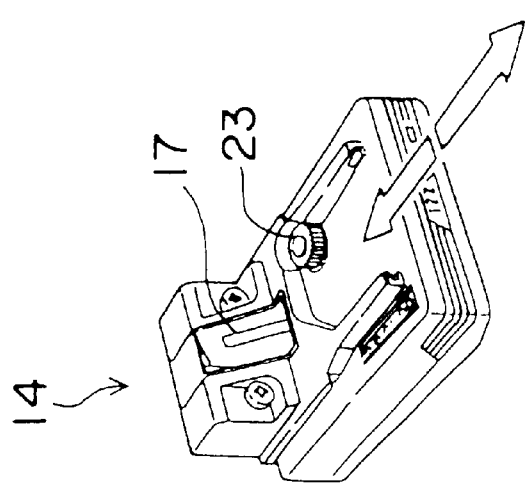

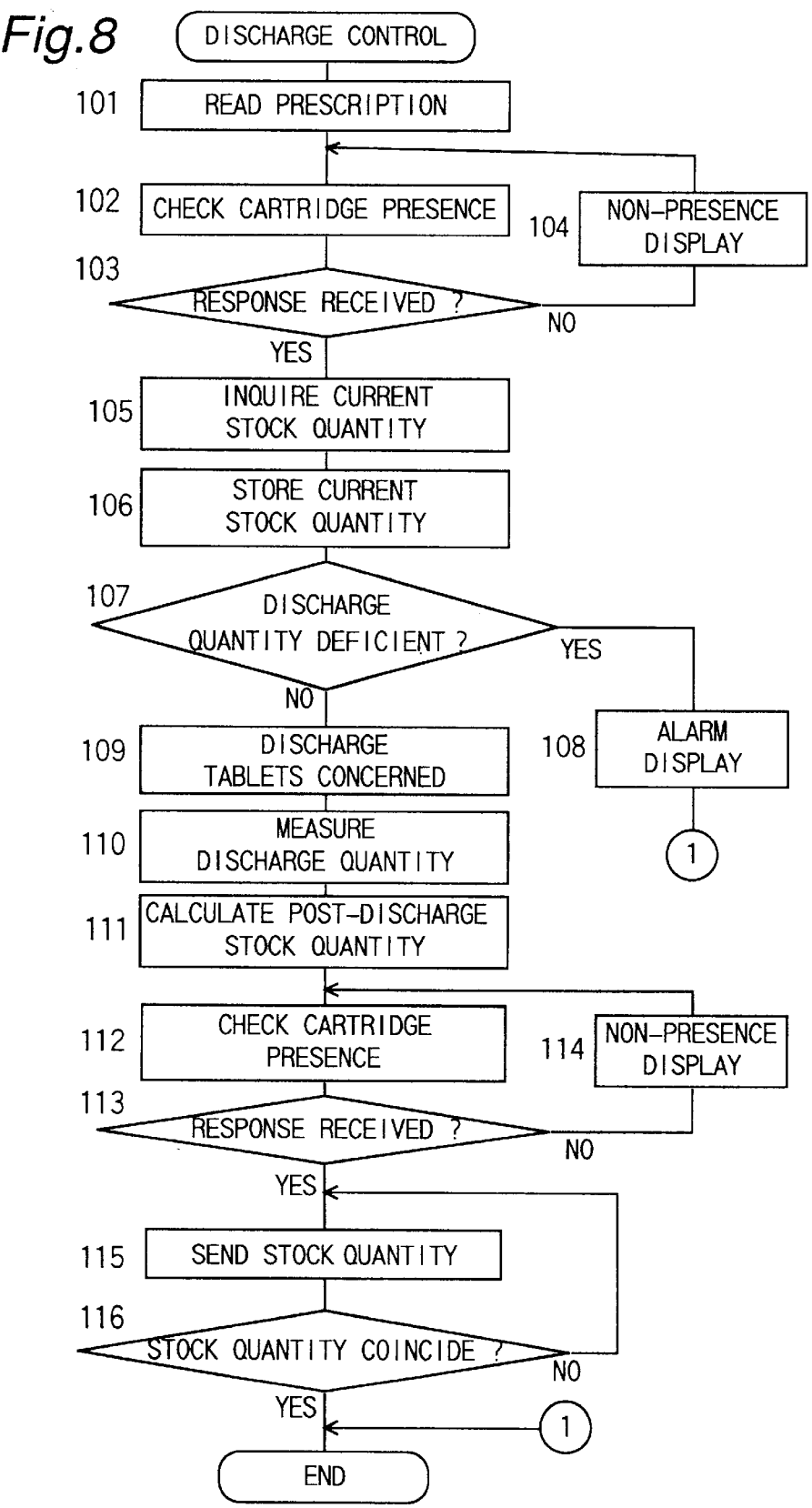

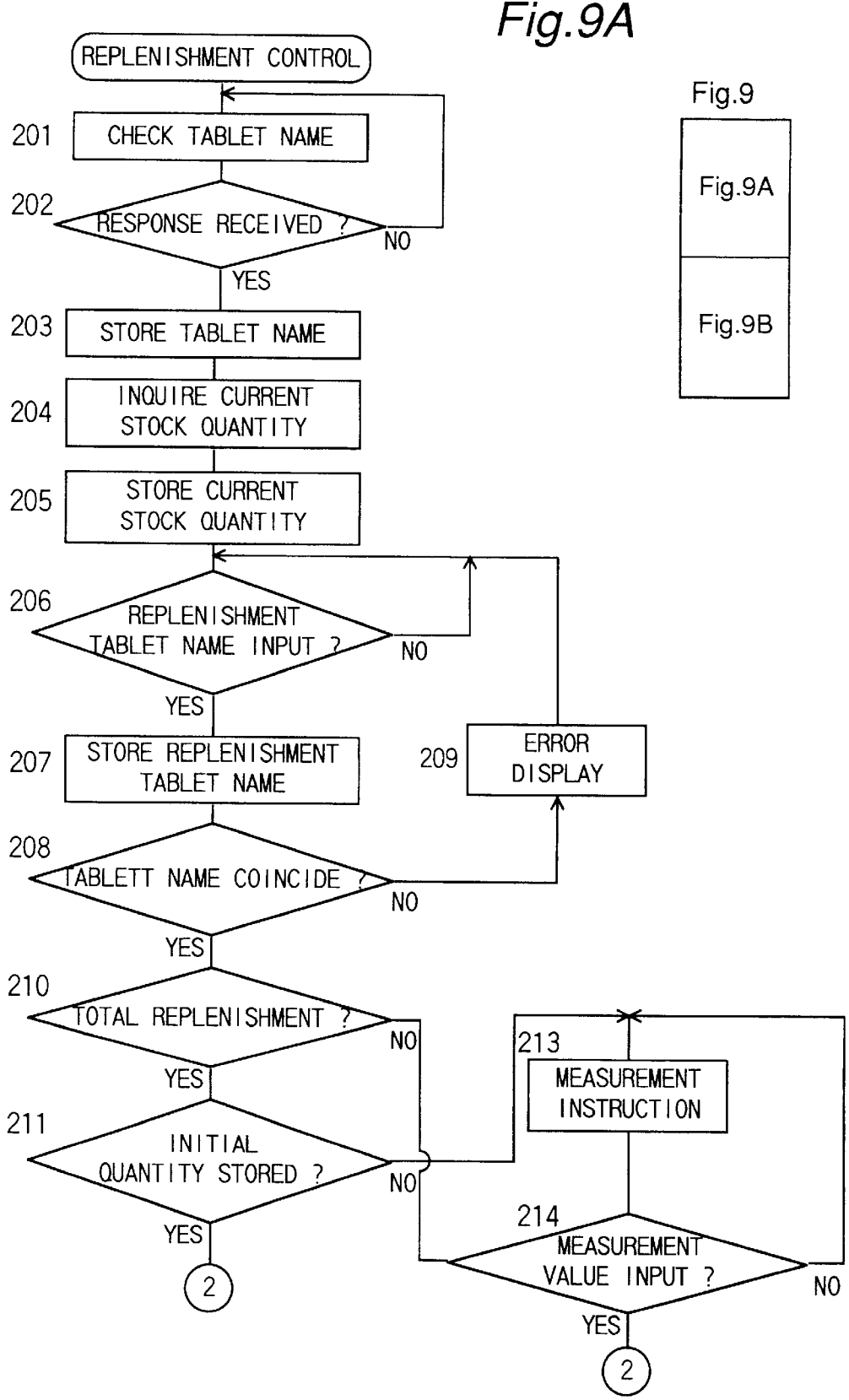

METHOD FOR MEDICAMENT STOCK MANAGEMENT BY TRANSPONDERS AND APPARATUS THEREFOR

BACKGROUND OF THE INVENTION

1. Field of the Invention

The present invention relates to a method and apparatus for medicament stock management by transponders and, more particularly, to a method for managing medicament stock quantity wherein cartridges of a medicament discharging machine are each provided with a transponder for storing a stock quantity of medicament contained in the cartridge such that the stock quantity is updated at each time when medicament discharge or replenishment is made, and an apparatus for carrying out the method.

2. Description of the Prior Art

Hitherto, various methods have been proposed for management of stock quantity of medicament contained in medicament cartridges of a medicament discharging machine for discharging medicament, such as tablets, powder, and ampoule.

In Japanese Patent Application Laid-Open No. 2-269621, for example, there is proposed an apparatus of such an arrangement that the number of remaining tablets present in each respective cartridge of a plurality of tablet feeders is constantly detected so that when the number of tablets required for a prescription exceeds the number of remaining tablets, an indication is given to that effect.

In Japanese Patent Publication No. 5-60948 of which application was filed by the present applicant, a stock management method is proposed such that an anticipated stock number of tablets for each of a plurality of cartridges is calculated by subtracting the number of tablets required by a prescription from a current stock number of tablets, the cartridges being replenished with tablets when the anticipated stock number of tablets drops below a preset stock number of tablets, whereupon the anticipated stock number is replaced by the replenished number of tablets.

Further, in Japanese Patent Application Laid-Open No. 4-102168, there is proposed a stock management apparatus such that the stock quantity for each of a plurality of cartridges is retrieved and the resultant data is indicated on a display.

However, in any of the above described prior art, it is necessary to take the trouble of previously key inputting the quantities of medicament to be kept in respective cartridges and, in addition, it is necessary to provide a space for storing information on the quantities held in stock, which necessarily results in a substantial increase in the memory capacity requirement. Another problem with the prior art is that, since manual labor is relied upon for checking the medicament to be replenished with the medicament held in the cartridge, it is possible that a wrong medicament may be supplied for replenishment.

SUMMARY OF THE INVENTION

The present invention is directed to solving the foregoing problems with the prior art, and accordingly it is an object of the invention to provide a method and apparatus for medicament stock management by transponders wherein medicament information, such as stock quantity of medicament and so on, is stored in transponders disposed in individual cartridges, whereby labor of key inputting can be saved, memory capacity requirement can be reduced, and any errors which may otherwise be involved in medicament replenishment can be eliminated.

In order to accomplish the above object, the present invention, in its first aspect, provides a method for management of the stock of medicament to be discharged from a plurality of cartridges according to a prescription.

The method includes providing each of the plurality of cartridges with a transponder which operative, in response to an external command signal, to receive and store medicament information including name and quantity of a medicament and to externally transmit the stored medicament information. The method also includes measuring discharge quantity of medicament to be discharged from the cartridge and reading a current stock quantity of medicament stored in the transponder, subtracting the discharge quantity from the current stock quantity, and writing the balance as a new stock quantity of the medicament into the transponder.

In its second aspect, the invention provides a method for management of the stock of medicament to be discharged from a plurality of cartridges according to a prescription and to be replenished from medicament containers as required.

The method includes providing each of the plurality of cartridges with a transponder which is operative, in response to an external command signal, to receive and store medicament information including name and quantity of a medicament and to externally transmit the stored medicament information. The method also includes measuring a discharge quantity of medicament to be discharged from the cartridge, reading current stock quantity of medicament stored in the transponder, subtracting the discharge quantity from the current stock quantity, and writing the balance as new stock quantity of the medicament into the transponder. The method also includes identifying a name of the medicament stored in one of the medicament containers, and reading a name of the medicament stored in the transponder of the cartridge. The method further includes verifying coincidence of the name of the medicament of the cartridge with the name of the medicament of the medicament container, and then reading the current stock quantity of medicament in the transponder, adding to the current stock quantity the quantity of medicament replenished from the medicament container into the cartridge, and writing the total as new stock quantity of medicament into the transponder.

In its third aspect, the invention provides an apparatus for management of the stock of medicament to be discharged from a plurality of cartridges according to a prescription.

The apparatus includes a transponder provided in each of the cartridges operative, in response to an external command signal, to receive and store medicament information including name and quantity of a medicament and to externally transmit the stored medicament information and a measuring device for measuring a discharge quantity of medicament to be discharged from the cartridge. The apparatus also includes a read/write device for transmitting a read/write command signal to the transponder with respect to the medicament information, and a discharge control device operative to transmit a read command signal to the transponder through the read/write device to read current stock quantity of medicament and, after subtracting the discharge quantity measured by the measuring device from the current stock quantity, to transmit a write command signal to the transponder through the read/write device for writing the balance as new stock quantity of medicament.

In its fourth aspect, the invention provides an apparatus for management of the stock of medicament to be discharged from a plurality of cartridges according to a prescription and to be replenished from medicament containers as required.

The apparatus includes a medicament discharge section and a medicament replenishment section. The medicament discharge section includes a transponder provided in each of the cartridges operative, in response to an external command signal, to receive and store medicament information including name and quantity of a medicament and transmit the stored medicament information to external, and a measuring device for measuring discharge quantity of medicament to be discharged from the cartridge. The medicament discharge section also includes a read/write device for transmitting a read/write command signal to the transponder with respect to the medicament information, and a discharge control device operative to transmit a read command signal to the transponder through the read/write device to read current stock quantity of medicament and, after subtracting the discharge quantity measured by the measuring device from the current stock quantity, to transmit a write command signal to the transponder through the read/write device for writing the balance as new stock quantity of medicament.

The medicament replenishment section includes an identification device for identifying a name of the medicament stored in one of the medicament containers, a read/write device for transmitting a read/write command signal to each transponder with respect to medicament information, and a replenishment control device operative to transmit a read command signal to the transponder through the read/write device for reading a name of the medicament and, after verifying coincidence of the name of the medicament of the medicament cartridge with the name of the medicament of the medicament container identified by the identification device, to transmit a read command signal to the transponder through the read/write device for reading the current stock quantity and, after adding to the current stock quantity the quantity of medicament replenished from the medicament container into the cartridge, to transmit a write command signal to the transponder through the read/write device for writing the total as new stock quantity of medicament into the transponder.

In the above fourth aspect of the invention, it is desirable that the quantity of medicament replenished from the medicament container into the cartridge is measured by a measuring device. Alternatively, it is desirable that the quantity of medicament replenished from the medicament containers into the cartridge is previously called from a memory for storing initial quantity of the medicament container for each medicament designation.

According to the first aspect (method for medicament stock management) and third aspect (apparatus for medicament stock management) of the invention as described above, current stock quantity is constantly stored in the transponder of each cartridge. This provides for a memory capacity reduction with respect to an external memory device and saves the labor of key inputting the stock quantity data.

According to the second aspect (method for medicament stock management) and fourth aspect (apparatus for medicament stock management) of the invention as described above, when a cartridge comes to have no or only little stock quantity during the stock management at the time of medicament discharge, the cartridge is removed. Then, a medicament container on the storage shelf unit is selected in order to replenish the cartridge with the medicament stored in the medicament container. At this medicament replenishment, stock management is also carried out. Thus, at each time when a medicament is discharged from a cartridge and replenished thereto, current stock quantity is constantly stored in the transponder of the cartridge. This also provides for a memory capacity reduction with respect to external memory device and saves the labor of key inputting the discharge quantity data as well as the replenishment quantity data. Since the name of the medicament in each medicament vessel is checked for coincidence with the name of the medicament in the corresponding cartridge, medicament replenishment can be performed safely and without involving any error.

BRIEF DESCRIPTION OF THE DRAWINGS

Further objects and advantages of the present invention will become clear from the following description taken in conjunction with the preferred embodiments thereof with reference the accompanying drawings, in which

FIG. 3 is an exploded view in perspective showing a tablet feeder and a tablet cartridge;

FIG. 8 is a flow chart showing a stock management operation at discharge control;

FIG. 9A is a flow chart showing a stock management operation at replenishment control.

DETAILED DESCRIPTION OF THE PREFERRED EMBODIMENTS

Figure 1:
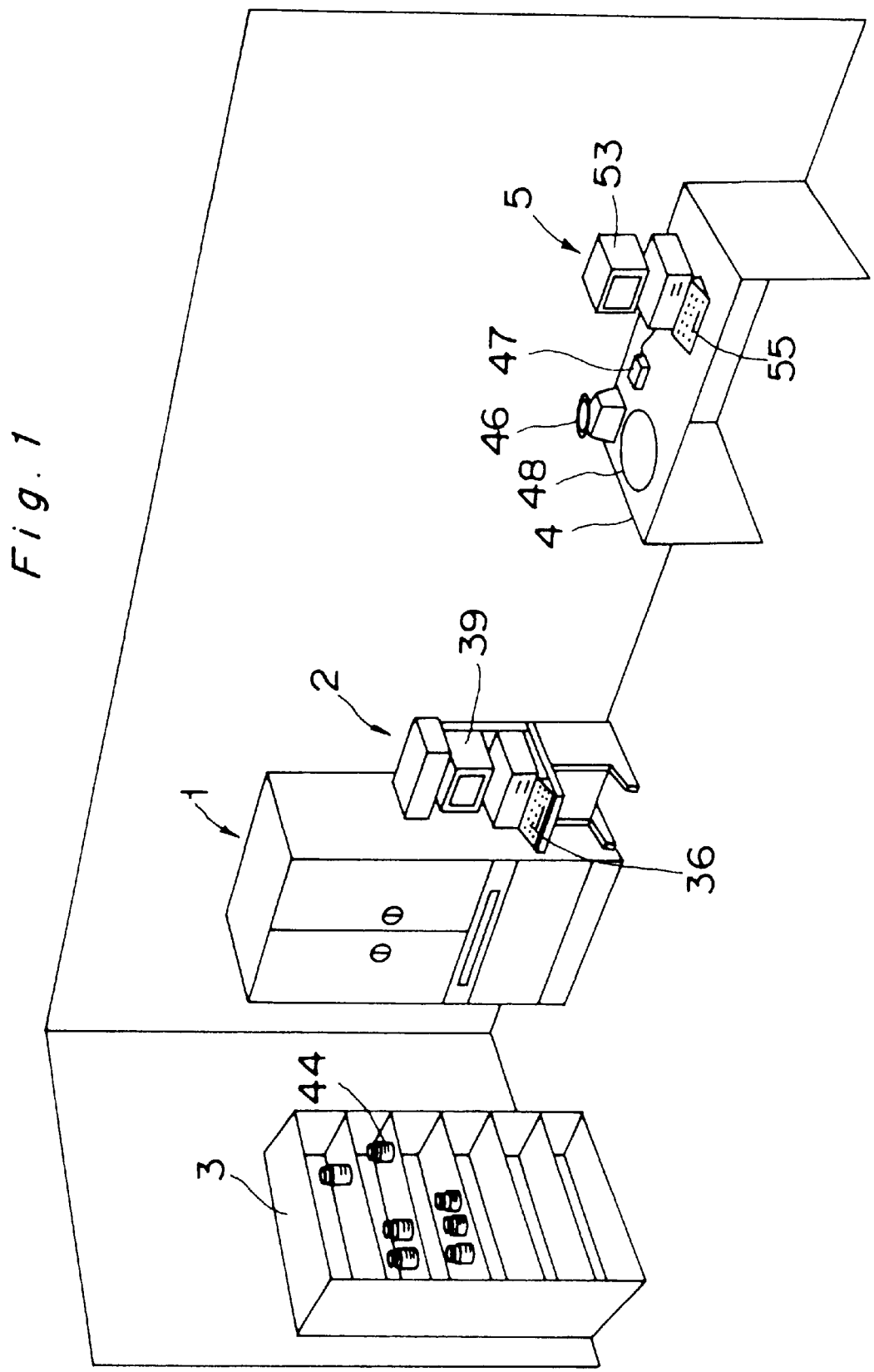
FIG. 1 is a perspective view showing a tablet dispensing system to which the present invention is applied.

FIG. 1 illustrates a tablets dispensing system in which the method and apparatus for stock management in accordance with the invention is employed. The system comprises a tablet dispensing unit 1, a tablet discharge control unit 2, a tablet storage shelf unit 3, and a tablet replenishment control unit 5 set on a work table 4.

Figure 2:
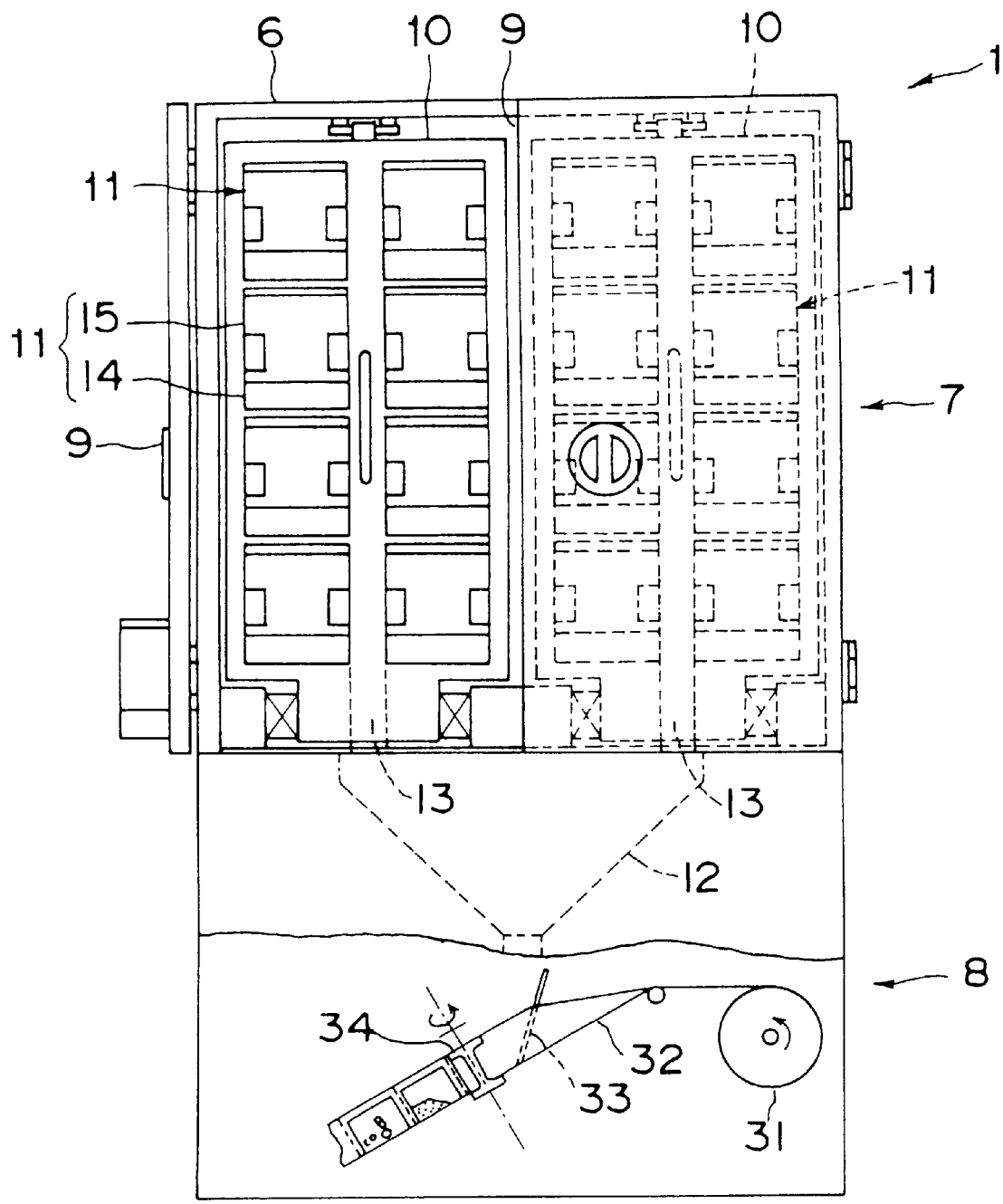
FIG. 2 is a partially broken-away front view of a tablet dispensing unit.

The tablet dispensing unit 1, as FIG. 2 shows, includes a feeder portion 7 located in a upper interior portion of a box-like casing 6 and a packing portion 8 located in a lower interior portion of the casing 6.

The feeder portion 7 houses two sliding members adapted to be pulled out toward the front side when a front door 9 of the casing 6 is held open. Each sliding member 10 accommodates a multiplicity of tablet feeders 11 arranged therein and is formed with a central discharge passageway 13 for causing tablets discharged from each tablet feeder 11 to be directed into a hopper 12 located below the member 10.

Figure 4:
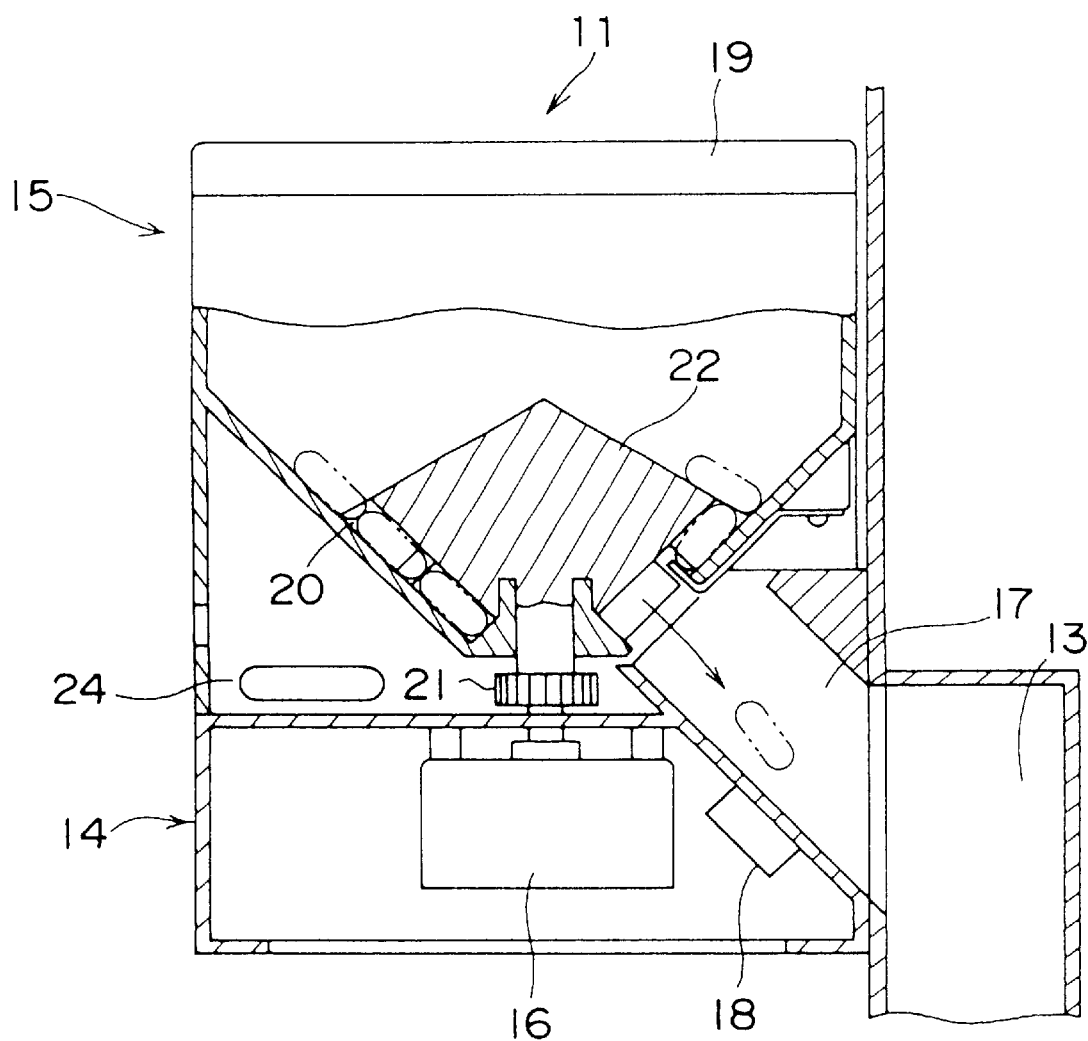
FIG. 4 is a sectional view showing a tablet feeder and a tablet cartridge.

Each tablet feeder 11, as FIG. 3 shows, comprises a motor base 14 fixed to the sliding member 10, and a cartridge 15 removably attached to the motor base 14. As FIG. 4 shows, the motor base 14 houses a drive motor 16 and is formed with a chute 17 leading to the central discharge passageway 13. In the motor base 14 there is disposed a measuring device 18 for measuring the number of tablets to be discharged through the chute 17. Each cartridge 15 is an open topped container of generally rectangular shape which is closable by a cover 19 and adapted to contain tablets therein.

Disposed at the bottom of the cartridge 15 is a rotor 22 having a plurality of pockets 20 on its outer periphery and a gear 21 at its lower end. This rotor 22 is such that when the cartridge 15 is mounted to the motor base 14, the gear 21 engages with the gear 23 (see FIG. 3) of the drive motor 16 of the motor base 14, whereby the rotor 22 is driven into rotation so that tablets which have entered pockets 20 are discharged one by one through the chute 17 into the central discharge passageway 13. A transponder 24 is housed in each cartridge 15.

Figure 5:
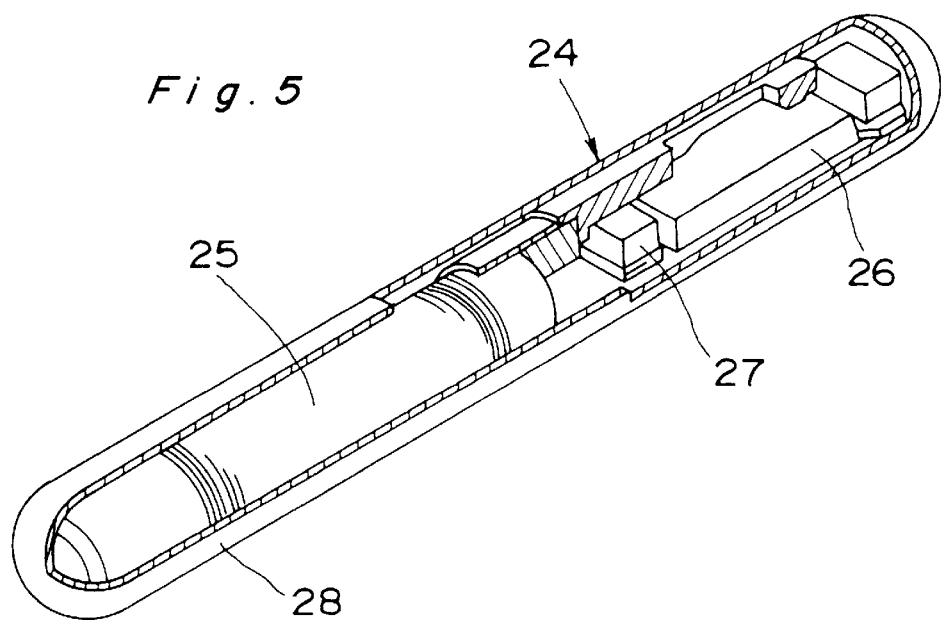
FIG. 5 is a broken-away view in perspective of a transponder.
Figure 6:
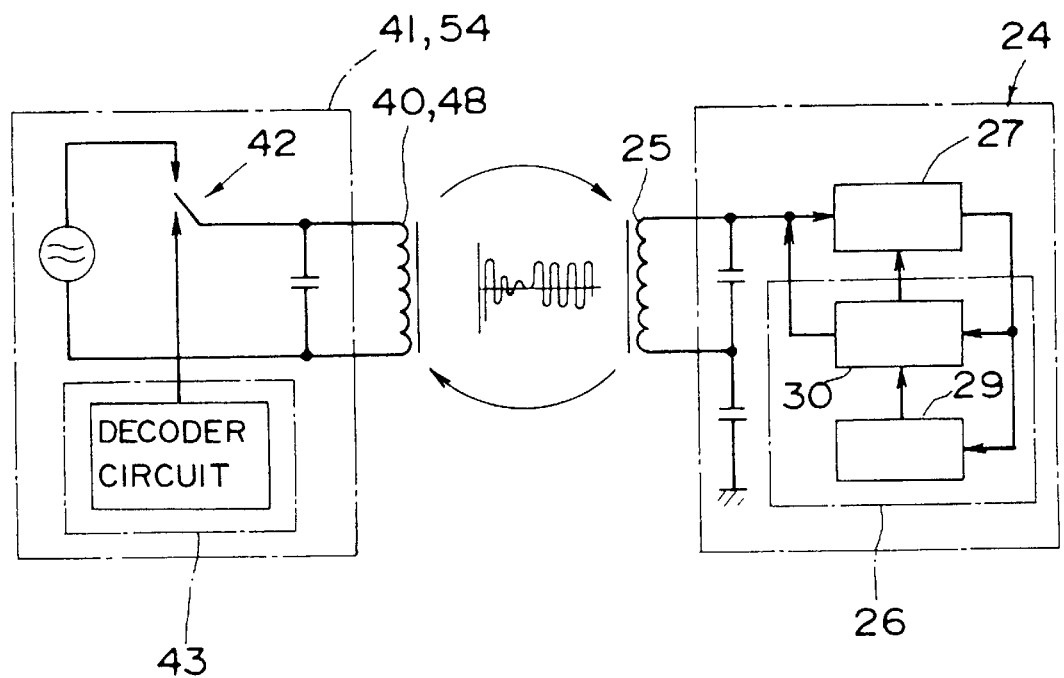
FIG. 6 is a schematic diagram showing a read/write unit and a transponder.

As shown in FIG. 5, the transponder 24 comprises a ferrite antenna 25, a C-MOS IC chip 26, and a power source capacitor 27, all enclosed in a hard glass tube 28. The IC chip 26, as FIG. 6 shows, is formed with a RAM memory 29, a control circuit 30 necessary for communication, and the like. The power source capacitor 27 stores power obtained by commutating radio waves received through antenna 25 from read/write device 41, 54 which will be described hereinafter. The power stored in the power source capacitor 27 is used to transmit a signal. The memory 29 records tablet information, in coded form, including the name of tablet housed in cartridge 15 and the stock of such tablets. The control circuit 30 writes tablet information in the memory 29 on the basis of a signal received through antenna 25, and reads tablet information stored in the memory 29.

The packing portion 8, as FIG. 2 shows, double folds via, a triangular plate 33, packing paper 32 wound on a roll 31 and, after one package of tablets discharged from the feeder portion 7 via hopper 12 is received into the double folded portion, the packing portion 8 seals the folded package by means of a heat seal device 34, then discharges the same.

Figure 7:
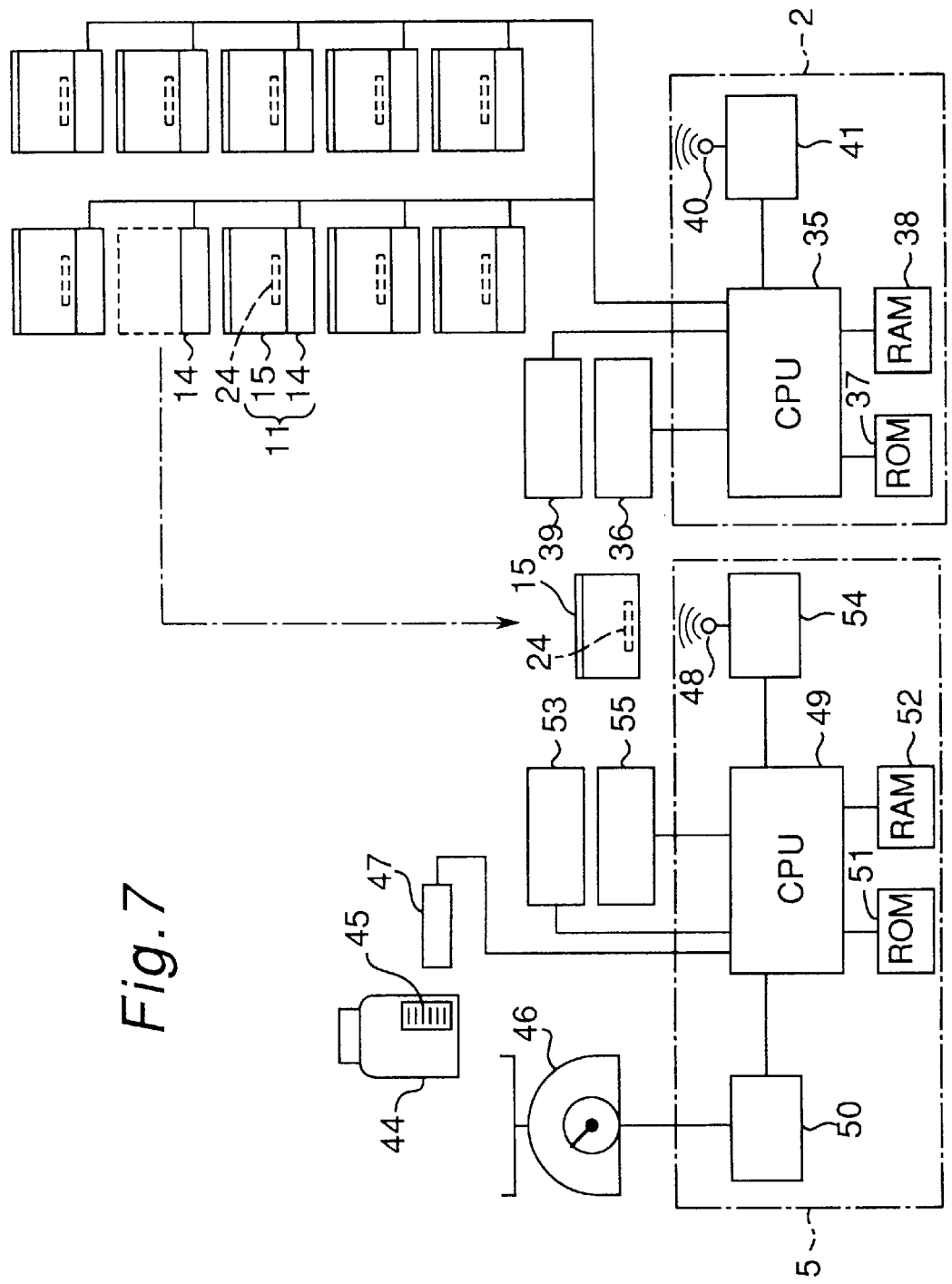
FIG. 7 is a control block diagram of a stock management apparatus of the invention.

The tablet discharge control unit 2, as FIG. 1 shows, is disposed alongside the tablet dispensing unit 1. The control unit 2 controls the feeder portion 7 and packing portion 8 of the tablet dispensing unit 1, and also performs stock management with respect to tablets held in cartridges 15. The description to be given hereinafter relates only to the arrangement for tablet stock management. As FIG. 7 shows, the tablet discharge control unit 2 comprises a central processing unit (hereinafter referred to as CPU) 35, an input device 36 for inputting information on tablet prescription on the basis of a prescription, a ROM memory 37 for storing control programs and the like, a RAM memory 38 for storing input information and the like, a display device 39, and a read/write device 41 having an antenna 40 for the transponders 24 in individual cartridges 15.

The read/write control device 41, as FIG. 6 shows, comprises an RF module 42 and a control module 43 having a transmit/receive decoder circuit. During a writing operation, the control module 43 converts a tablet information received from the CPU 35 into a transmission signal conforming to a certain communication procedure for data writing as arranged with the transponder 24, and then the RF module 42 modulates the transmission signal into a signal of a predetermined frequency, for example, an FSK signal to transmit it through the antenna 40. During a reading operation, the RF module 42 demodulates a transmission signal received from the transponder 24 by the antenna 40, and then the control module 43 converts the demodulated signal into a digital signal to input it into the CPU 35.

In the present embodiment, a transmission signal from the read/write device 41 to the transponder 24 comprises a combination of a power signal for activating the transponder 24, a tablet identification signal, and control signals. As the control signals, three kinds of signals are used, namely, (1) a cartridge presence check signal for checking whether or not the cartridges 15 containing the tablets concerned are present in the feeder portion 7 of the tablet dispensing unit 1, (2) a current stock quantity inquiry signal for inquiring the current stock quantity of tablet stored in respective transponders 24, and (3) a new stock quantity write signal for updating the current stock quantity of tablet stored in respective transponders 24 to a new stock quantity.

Whilst, as a response signal from each transponder 24 to the read/write device 41, two kinds of signals are used, namely, an identification signal as a response to the cartridge presence check signal, and a stock quantity signal as a response to the current stock quantity inquiry signal or the new stock quantity write signal.

On the tablet storage shelf unit 3, as FIG. 1 shows, are stored a large number of tablet containers 44 which contain tablets for supply to the cartridges 15 of the tablet dispensing unit 1 for replenishment. Each tablet container 44 has a bar code 45 (see FIG. 7) affixed thereto for identifying the name of tablets held in the container 44.

On the work table 4 are mounted a tablet replenishment control device 5 including a personal computer and, in addition, a measuring instrument 46, a bar code reader 47, and an antenna 48 for the transponders 24 provided in the cartridges 15.

The tablet replenishment control device 5, as FIG. 7 shows, comprises a CPU 49, a data converter device 50 for converting a count value from the measuring instrument 46 into a digital value, a ROM memory 51 for storing a control program and the like, a RAM memory 52 for storing input information and the like, a display unit 53, a read/write device 54 having the antenna 48 for the transponders 24 provided in the cartridges 15, and an input device 55. Each tablet container 44 for containing tablets to be replenished is usually stored as purchased on the tablet storage shelf unit 3, and therefore an initial quantity of tablets contained therein is predetermined according to the description of the tablet. This initial quantity of tablets is previously stored in the ROM memory 51. Therefore, when the tablets contained in the tablet container 44 are to be wholly replenished, counting by the measuring instrument 46 is not required because the quantity to be replenished can be made known by calling information stored in the ROM memory on the initial quantity of tablets in the container 44. The arrangement of the read/write device 54 is identical to that of the read/write device 41 of the tablet discharge control unit 2, and therefore description thereof is omitted. Transmit/receive signals for communication between the read/write device 54 and the transponders 24 are as follows.

A transmission signal from the read/write device 54 to the transponder 24 comprises a combination of a power signal for activating the transponder 24, a tablet identification signal, and control signals. As the control signals, four kinds of control signals are used, namely, (1) a tablet name check signal, (2) a cartridge presence check signal for checking whether or not the cartridge 14 containing the tablets concerned is present on the work table 4, (3) a current stock quantity inquiry signal for inquiring for the current stock quantity of tablets stored in respective transponders 24, and (4) a new stock quantity write signal for updating the current stock quantity of tablets stored in respective transponders 24 to a new stock quantity.

Whilst, as a response signal from each transponder 24 to the read/write device 54, two kinds of signals are used, namely, an identification signal as a response to the tablet name check signal or the cartridge presence check signal, and a stock quantity signal as a response to the current stock quantity inquiry signal or the new stock quantity write signal.

Next, operation procedures for stock management by the tablet discharge control unit 2 and tablet replenishment control device 5 will be described with reference to flow charts given in FIGS. 9 and 10.

FIG. 8 shows the operation procedure for stock management of the tablets in the cartridge 15 during the medicament discharging and packing operation of the tablet dispensing unit 1.

First, at step 101, a prescription is read by the input device 36. At step 102, a presence check signal for a cartridge 15 in which tablets to be first packed are contained is transmitted from the read/write device 41 of the tablet dispensing unit 1 to the transponder 24 of each cartridge 15 through the antenna 40. If no response is received at step 103, then at step 104, an indication as to non-presence of the cartridge 15 concerned is given on the display unit 39. If there is a response, then at step 105, a current stock quantity inquiry signal is transmitted to the transponder 24. When a response signal on current stock quantity is received from the transponder 24, at step 106, the current stock quantity data is stored in the RAM memory 38 on the basis of the response signal.

Then, at step 107, judgment is made whether or not there is a deficiency in a discharge quantity by subtracting a necessary quantity of tablets based on the prescription from the current stock quantity. If there is a deficiency, at step 108, an alarm display is given on display unit 39 to prompt an operator to make replenishment. If there is no deficiency, at step 109, tablet dispensing unit 1 is activated to perform a discharge operation with respect to the tablets concerned. Thus, tablets corresponding to the prescription are discharged from the cartridge 15, packing of the tablets being effected by packing portion 8. During this discharge operation, at step 110, the discharge quantity of tablets is measured by the measuring device 18. At step 111, a post-discharge stock quantity is calculated by subtracting the discharge quantity from the current stock quantity.

At step 112, a presence checking signal for the cartridge 15 concerned is again transmitted from the read/write device 41 of the tablet dispensing unit 1 to the transponder 24. If no response is received at step 113, a display of non-presence is given at step 114. If there is a response, then at step 115, a stock quantity write signal is transmitted to cause the transponder 24 to write the stock quantity calculated at step 111 as a new stock quantity. Then, at step 116, judgment is made whether or not the stock quantity received from the transponder 24 in response to the stock quantity write signal coincides with the stock quantity transmitted. If the two do not coincide, a stock quantity write signal is transmitted again, and if they coincide, operation ends.

The foregoing steps are executed at each time when tablet discharge is made in accordance with a prescription. Therefore, the stock quantity of tablets contained in each cartridge 15 is constantly stored in the transponder 24 of the cartridge 15. Hence, the entire stock quantity of tablets for all cartridges 15 need not be stored in the RAM memory 38.

Figure 9B:
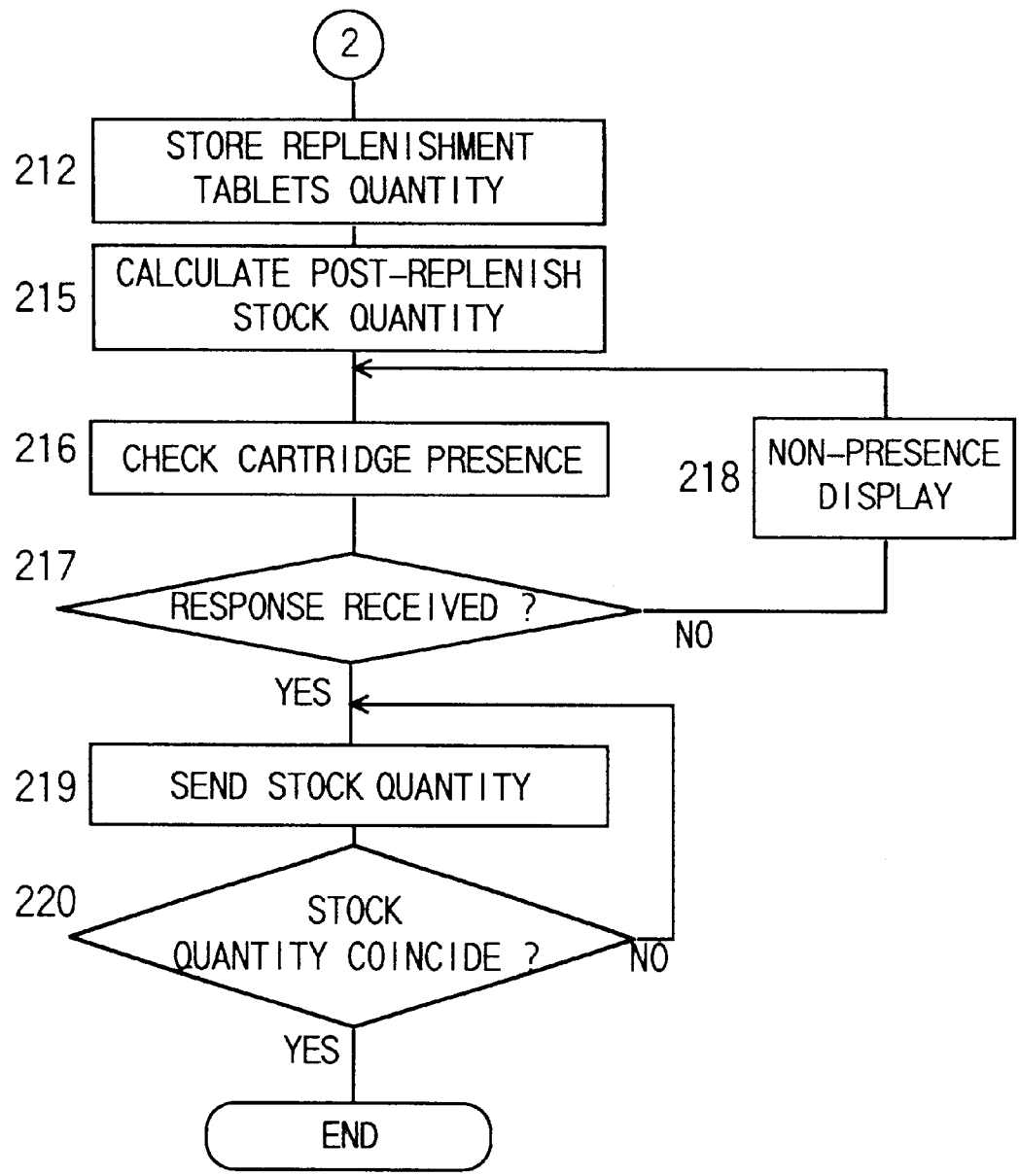
FIG. 9B is a flow chart showing an operation subsequent to FIG. 9 operation.

FIGS. 9 and 10 show the operation procedure of the tablet replenishment control device 5 in case where an alarm display is made to the effect that the discharge quantity of tablet falls into deficiency during the operation of the tablet dispensing unit 1 and where a relevant cartridge 15 is removed for replenishment supply of tablets thereinto on the work table 4.

First, at step 201, a tablet name check signal is transmitted from the read/write device 54 of the tablet replenishment control device 5 to the transponder 24 of the relevant cartridge 15 through the antenna 48. If, at step 202, no response is received from the transponder 24, it is meant that the cartridge 15 is not yet placed in a predetermined position on the work table 4. Thus, operation returns to step 201 and the tablet name check signal is continually transmitted until the cartridge 15 is placed on the work table 4. When, at step 202, a response is received, the tablet name is stored at step 203 and then, at step 204, a current stock quantity inquiry signal is transmitted to the transponder 24. Then, at step 205, the current stock quantity is stored in the RAM memory 52 on the basis of the response signal received.

A tablet container 44 which contains tablets to be supplied for replenishment is fetched from the tablet storage shelf unit 3 to place on the work table 4, and the bar code 45 of the tablet container 44 is read by a bar code reader 45. Then, at step 206, judgment is made whether or not an information has been input on the name of the tablets to be supplied for replenishment. If there is no such input, a standby position is taken until reading of the tablet container 44 is made by the bar code reader 47. If there is such an input, then at step 207, the name of tablets to be supplied for replenishment is stored in the RAM memory 52 and, at step 208, judgment is made whether or not the name of tablets to be supplied for replenishment coincides with the name of tablets in the cartridge 15. If they do not coincide, then at step 209, an error indication is displayed on display unit 53 to notify the operator of the fact that the tablet container 44 is a wrong one. Then, operation returns to step 206. If they coincide, then at step 210, judgment is made whether or not all tablets in the tablet container 44 are supplied for replenishment. In this connection, it is noted that an input as to whether or not entire replenishment or partial replenishment is made is effected on the basis of visual judgment of the operator with respect to the space available for replenish supply within the cartridge 15 and the quantity of tablets contained in the tablet container 44. Therefore, judgment as to total replenishment or partial replenishment can be made according to which way of replenish decision has been input.

If all tablets contained in the tablet container 44 are to be applied for replenishment, then at step 211, judgment is made whether or not data on the initial quantity of tablets available for replenishment has been stored in the ROM memory. If there has been such data, then at step 212, the initial quantity is stored in the RAM memory 52. If there has been no such data, then at step 213, an instruction for measurement is given to the operator. When measurement is carried out by the operator, at step 214, judgment is made whether or not the value of measurement has been input from the measuring instrument 46 through the data conversion device 50. If there has been such an input, then at step 212, the input data is stored as a replenishment tablet quantity. If there is no such input, operation returns to step 213 and an instruction is given again to carry out measurement. If, at step 210, judgment is made for partial replenishment, not total replenishment, the operator takes out a suitable quantity of tablets from the tablet container 44 and measures the same by means of the measuring instrument 46. Thus, after passage through step 214, and at step 212, the measured value is stored as a replenishment tablet quantity.

After the replenishment tablet quantity has been stored in the RAM memory 52 at step 212, a post-replenishment stock quantity is calculated at step 215 by adding the replenishment quantity to the current stock quantity. Then, at step 216, a cartridge presence check signal is transmitted again from the read/write device 54 of tablet replenishment control device 5 to the transponder 24. If there is no response at step 217, then at step 218, a non-presence display is given at step 218. If a response is received, then at step 219, a stock quantity write signal is transmitted to cause the transponder 24 to write the stock quantity calculated at step 215 as a new stock quantity. Then, at step 220, judgment is made whether or not the stock quantity received from the transponder 24 in response to the stock quantity write signal coincide with the stock quantity transmitted. If there is no coincidence, a stock quantity write signal is transmitted again. If they coincide, operation ends.

In the foregoing embodiment, the tablet dispensing unit 1 is of the sliding box type. It is understood, however, that the configuration of the tablet dispensing unit 1 is not limited to such a type, but may be of the rotary type or of any other known type. Needless to say, the tablet dispensing unit 1 is also applicable for use as a powder dispensing unit or an ampoule discharging unit.

Although the present invention has been fully described by way of the examples with reference to the accompanying drawing, it is to be noted here that various changes and modifications will be apparent to those skilled in the art. Therefore, unless such changes and modifications otherwise depart from the spirit and scope of the present invention, they should be construed as being included herein.

What is claimed is:

1. A method for management of stock of medicament for use with a medicament dispensing apparatus including a plurality of medicament cartridges for containing medicament and a plurality of motor bases on each of which a respective one of the medicament cartridges is mounted to dispense the medicament from the medicament cartridges according to a prescription, said method comprising:

providing a plurality of transponders such that each of the transponders is to be provided in a respective medicament cartridge;

sending an external command radio signal to the transponders and receiving and storing medicament information in the transponders in response to the external command radio signal, wherein the medicament information includes a name and current stock quantity of a medicament in the respective medicament cartridge, and externally transmitting the stored medicament information from the transponders in response to the external command radio signal;

measuring a discharge quantity of medicament to be discharged from the cartridges; and reading the current stock quantity of medicament of the respective medicament cartridge from the transponder provided in the respective medicament cartridge, subtracting the discharge quantity, measured by said measuring, for the respective medicament cartridge from the current stock quantity of the respective medicament cartridge so as to produce a balance value, and thereafter transmitting a write command signal to the transponders to write the balance value as a new stock quantity of medicament for the respective medicament cartridge.

2. A method for management of stock of medicament for use with a medicament dispensing apparatus including a plurality of medicament cartridges for containing medicament and a plurality of motor bases on each of which a respective one of the medicament cartridges is mounted to dispense the medicament from the medicament cartridges according to a prescription and for use with medicament containers for management of stock of medicament to be replenished from the medicament containers as required, said method comprising:

providing a plurality of transponders such that each of the transponders is to be provided in a respective medicament cartridge;

sending an external command radio signal to the transponders and receiving and storing medicament information in the transponders in response to the external command radio signal, wherein the medicament information includes a name and current stock quantity of a medicament in the respective medicament cartridge, and externally transmitting the stored medicament information from the transponders in response to the external command radio signal;

measuring a discharge quantity of medicament to be discharged from the cartridges;

reading the current stock quantity of medicament of the respective medicament cartridge from the transponder provided in the respective medicament cartridge, subtracting the discharge quantity, measured by said measuring, for the respective medicament cartridge from the current stock quantity of the respective medicament cartridge so as to produce a balance value, and thereafter transmitting a write command signal to the transponders to write the balance value as a new stock quantity of medicament for the respective medicament cartridge;

identifying a name of the medicament stored in one of the medicament containers;

reading a name of the medicament stored in the respective medicament cartridge from the transponder provided in the respective medicament cartridge;

verifying coincidence of the name of the medicament of the respective medicament cartridge with the name of the medicament of the one medicament container; and then reading the current stock quantity of medicament from the transponder provided in the respective medicament cartridge, adding a quantity of medicament replenished from the one medicament container into the respective cartridge to the current stock quantity so as to produce a total value, and writing the total value as a new stock quantity of medicament into the transponder provided in the respective medicament cartridge.

3. A medicament stock management apparatus for use with a medicament dispensing apparatus including a plurality of medicament cartridges for containing medicament and a plurality of motor bases on each of which a respective one of the medicament cartridges is mounted to dispense the medicament from the medicament cartridges according to a prescription, said medicament stock management apparatus comprising:

a plurality of transponders, each of said transponders to be provided in a respective medicament cartridge, wherein each transponder is operable, in response to an external command radio signal, to receive and store medicament information including a name and current stock quantity of a medicament in the respective medicament cartridge and externally transmit the stored medicament information;

measuring means for measuring a discharge quantity of medicament to be discharged from the medicament cartridges;

read/write means for transmitting a read/write command signal to said transponders with respect to the medicament information; and discharge control means for transmitting a read command signal to said transponders through said read/write means to read a current stock quantity of medicament in the respective medicament cartridge, subtracting the discharge quantity measured by said measuring means for the respective medicament cartridge from the current stock quantity of the respective medicament cartridge so as to produce a balance value, and for thereafter transmitting a write command signal to said transponders through said read/write means to write the balance value as a new stock quantity of medicament for the respective medicament cartridge.

4. A medicament stock management apparatus for use with a medicament dispensing apparatus including a plurality of medicament cartridges for containing medicament and a plurality of motor bases on each of which a respective one of the medicament cartridges is mounted to dispense the medicament from the medicament cartridges according to a prescription and for use with medicament containers for management of stock of medicament to be replenished from the medicament containers as required, said medicament stock management apparatus comprising:

a medicament discharge section including a plurality of transponders, each of said transponders to be provided in a respective medicament cartridge, wherein each transponder is operable, in response to an external command radio signal, to receive and store medicament information including a name and current stock quantity of a medicament in the respective medicament cartridge and externally transmit the stored medicament information, measuring means for measuring a discharge quantity of medicament to be discharged from the medicament cartridges, read/write means for transmitting a read/write command signal to said transponders with respect to the medicament information, and discharge control means for transmitting a read command signal to said transponders through said read/write means to read a current stock quantity of medicament in the respective medicament cartridge, subtracting the discharge quantity measured by said measuring means for the respective medicament cartridge from the current stock quantity of the respective medicament cartridge so as to produce a balance value, and for thereafter transmitting a write command signal to said transponders through said read/write means to write the balance value as a new stock quantity of medicament for the respective medicament cartridge; and a medicament replenishment section including identification means for identifying a name of the medicament stored in one of the medicament containers, read/write means for transmitting a read/write command signal to said transponders of said medicament discharge section with respect to the medicament information, and replenishment control means for transmitting a read command signal to said transponders of said medicament discharge section through said read/write means of said medicament replenishment section to read a name of the medicament stored in the respective medicament cartridge from the transponder provided in the respective medicament cartridge, for verifying coincidence of the name of the medicament of the respective medicament cartridge with the name of the medicament of the medicament container, for transmitting a read command signal to said transponders through said read/write means of said medicament replenishment section to read a current stock quantity of medicament in the respective medicament cartridge from the transponder provided in the respective medicament cartridge, for adding a quantity of medicament replenished from the medicament container into the respective cartridge to the current stock quantity to produce a total value, and for writing the total value as a new stock quantity of medicament into the transponder provided in the respective medicament cartridge.

5. A medicament stock management apparatus as claimed in claim 4, wherein said medicament replenishment section comprises a measuring means for measuring the quantity of medicament replenished from the medicament container into the respective cartridge.

6. A medicament stock management apparatus as claimed in claim 4, further comprising a memory operable to store an initial quantity of the medicament container for each medicament designation, wherein said replenishment control means is operable for reading the initial quantity from said memory as the quantity of medicament replenished from the medicament containers into the respective cartridges.

* * * * *